March 15, 1960  H. W. BURTON ET AL  2,928,240
CONTROL SYSTEM FOR REACTION MOTOR IGNITORS
Filed Jan. 27, 1953  2 Sheets-Sheet 1

INVENTORS
HARRISON W. BURTON
ERIC W. HARSLEM
BY
AGENT

United States Patent Office 2,928,240
Patented Mar. 15, 1960

2,928,240

CONTROL SYSTEM FOR REACTION MOTOR IGNITORS

Harrison W. Burton, Franklin Lakes, and Eric W. Harslem, Hackettstown, N.J., assignors, by mesne assignments, to Thiokol Chemical Corporation, a corporation of Delaware Application January 27, 1953, Serial No. 333,478

9 Claims. (Cl. 60—39.14)

The present invention relates to an electro-mechanical system for controlling the operation of a reaction motor igniter in a manner and sequence of operation which will insure safety of operation of the igniter and the rocket motor with which it is associated, and longer life for the ignition source.

Rocket motors, particularly those of the type which burn a liquid fuel in the presence of an oxidizer, tend to be erratic in their starting characteristics unless all conditions of injection of fuel and oxidizer, known as propellants, are exactly met and a source of ignition is provided at precisely the right time. If, through some malfunctioning of the propellant injection system, the mixture ratio of fuel to oxidizer is not proper, or for any other reason the fuel does not ignite at the proper time, the control system which comprises the present invention shuts off the electric current to the igniter glow plug ignition source, closes the motor's propellant supply valves, and operates a purging or "blowdown" means. This action stops the flow of propellants to the rocket motor, purges the combustion chamber of accumulated unignited propellants and prevents ignition thereof. Since late ignition brought about by the glow plug or self reaction of accumulated fuel in an oxygen-laden atmosphere would result in an explosion rather than an easy start of combustion, the need for an adequate and proper control system for performing these functions becomes important if the motor and its igniter are to be protected from damage.

It has also been found that for certain fuels a glow plug having an electrically-heatable element or "hot wire" is an effective device for igniting the fuel and appears in many cases to be more suitable than a spark plug, since it will continue to glow for an appreciable length of time while a spark plug operates only for an instant. The glow plug, however, has the inherent disadvantage of requiring appreciable time to heat to the proper temperature for fuel ignition to take place. Such loss of time is extremely important in the event that the glow plug is installed, for example, in a rocket motor in an aircraft where the time required for ignition must necessarily be as short as possible to enable the pilot of the aircraft to maintain proper control of his vehicle under all conditions of flight. Accordingly, in view of the fact that it is desirable to heat the glow plug element as rapidly as possible without damaging it, the present invention provides a control system whereby the glow plug element is electrically overloaded for a sufficient interval of time to allow it to heat to operating temperature after which the electric current is reduced to maintain this temperature.

In addition to the foregoing, it is important during the ignition period that the "hot wire" glow plug heatable element be established to be intact. This is necessary in order that the propellant flow may be shut off in the event of disruption of current flow through the element, for it is necessary under such circumstances that the propellant flow be stopped to prevent a dangerous accumulation of propellants within the igniter's combustion chamber. Also, it is essential that the element be intact before a new starting cycle is initiated. Accordingly, an ungrounded type of glow plug is utilized in the present invention in connection with a current-sensing relay so that failure of the glow plug element will be instantly detected.

It is, therefore, an object of the present invention to provide a glow plug ignition system wherein the continuity of the glow plug heatable element is constantly electrically supervised during operation of the ignition system.

It is also an object of the present invention to provide a glow plug ignition system for a rocket engine, in which system propellants are not permitted to flow unless the system's electrical circuit through the glow plug element is first established to be continuous.

It is also an object of the present invention to provide, in combination with the foregoing advantages, a control system for an electrical glow plug type rocket motor igniter which will allow the glow plug element to heat up rapidly by electrical current overload, but which will, after a pre-established time interval, reduce the electrical overload current to normal to protect the glow plug element and extend its life by the maintenance of a normal temperature therein.

It is also an object of the present invention to provide an electro-mechanical control system for a rocket motor igniter of the liquid or gaseous propellant type whereby injection of propellants into the igniter's combustion chamber is made to cease in the event that the ignition means has failed to ignite the fuel.

It is another object of the present invention to provide a dependable safety control system for a liquid or gaseous propellant igniter used with a rocket motor as the source of ignition therefor, which system prevents the accumulation of propellants within the igniter's or the motor's combustion chamber and prevents untimely ignition.

Other objects and advantages of the present invention will be apparent from the general and detailed description which follows.

Figure 1:
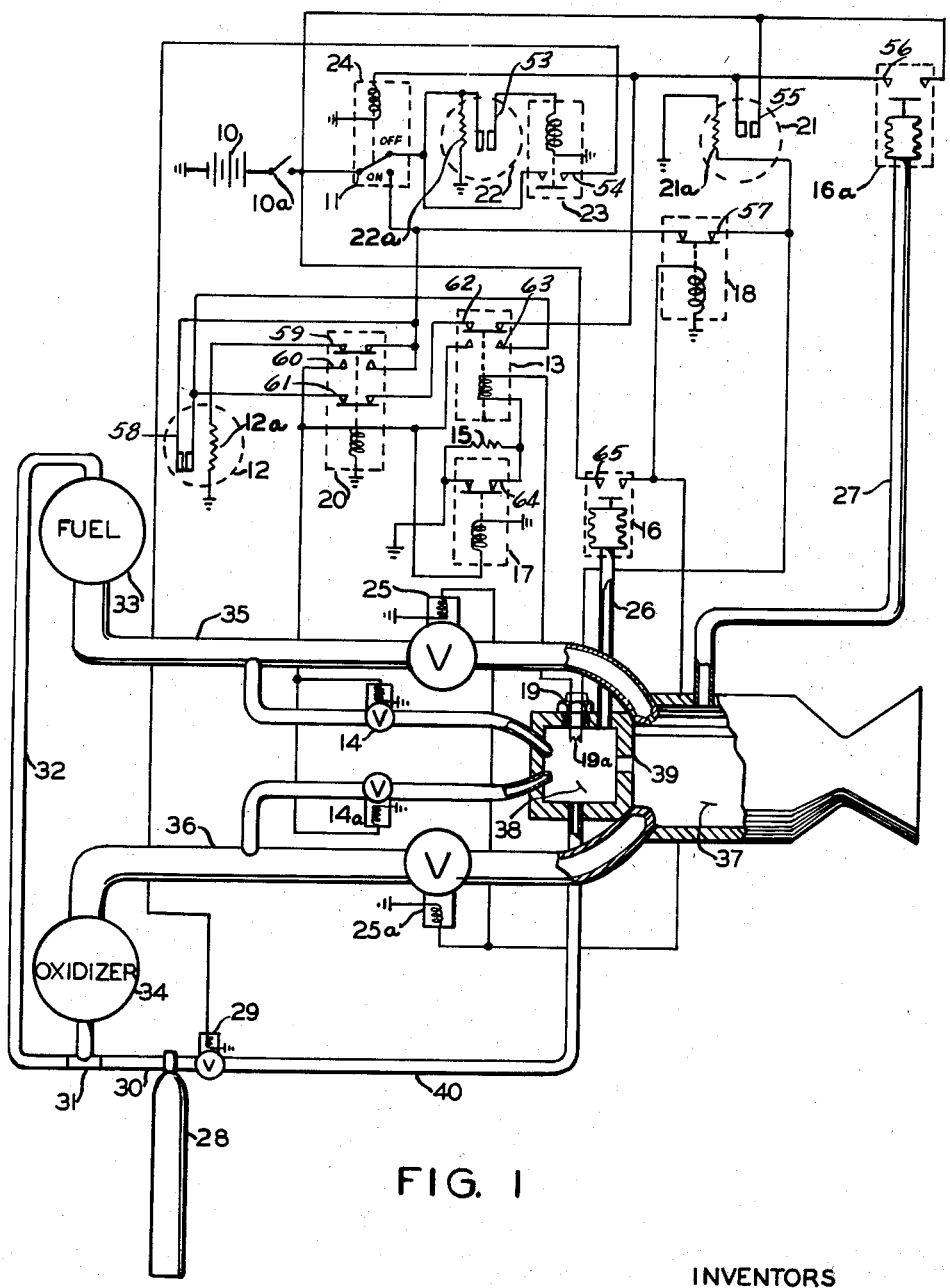
Figure 1 is a diagrammatic view of a liquid or gaseous propellant igniter system showing its connections to its electro-mechanical control system.

In an igniter system such as is illustrated in Figure 1, a liquid fuel is burned in a relatively small combustion chamber in the presence of an oxidizer to create a substantial flame for the ignition of fuel within a rocket motor combustion chamber. Such igniters may have one or more stages or successive combustion chambers, the propellants within each being ignited by the flame from its preceding stage. It is not the intention of applicants to be limited to a single stage igniter, or to any particular propellant or propellants since the present invention is adaptable to many different liquid or gaseous fuels ignitable by means of a glow plug.

Figure 2:
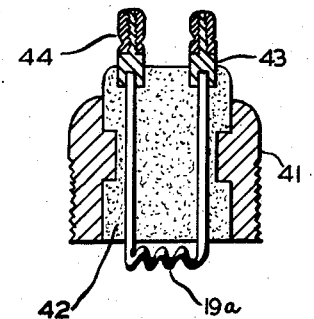
Figure 2 is a cross-sectional view of an ungrounded type of glow plug as utilized in the present invention.

Glow plug 19 is shown in cross-section in Figure 2 where its glow plug resistance element or "hot wire" 19a of metallic resistance wire is shown embedded in an insulator 42 of ceramic or other suitable material in such a manner that part of the wire is exposed at the lower end of the plug, preferably as a coil, while the two ends of the wire are connected to terminals 43 and 44. The insulator and its embedded resistance wire are set in a housing 41 threaded for insertion in the igniter housing. Wire 19a does not touch housing 41 at any point but is insulated from it and the ground by insulator 42.

In Figure 1, a source of electrical energy is provided in the form of a battery 10 which through shut off or master switch 10a supplies current to starting switch 11. If starting switch 11 is thrown to the On position, current flows through the closed contacts 57 of relay 18 to the heatable element or "hot wire" 19a of glow plug 19 from whence it flows through the coil of current-sensing relay 13 and the normally-closed contacts 64 of relay 17 to ground. Since there is little electrical resistance in this circuit, the current passing through the element of glow plug 19 will be considerable. Simultaneously, current is supplied from switch 11 through closed contacts 59 of relay 20 through the resistance element 12a of thermal time switch 12 to ground, and is also supplied to open contacts 58 of time switch 12. As the relatively heavy current flows through the resistance wire or heatable element 19a of glow plug 19, the element becomes heated quickly and would burn out from the overload of current if the overload was allowed to continue. Instead, after a predetermined time interval of the order of one-half of a second, time switch 12 closed its contacts 58 as its resistance element became heated, this action allowing current to flow from contacts 58 through the now closed contacts 63 of energized relay 13 and through the coil of relay 17 to ground. As relay 17 becomes energized, its previously closed contacts 64 open, thereby removing the shunt from resistor 15 and causing the current to flow through resistor 15 to ground. The shunt referred to is a low resistance conductor. With resistor 15 in the circuit, the current in the glow plug is reduced because of the added resistance and the resistance element 19a of glow plug 19 will not burn out although it will remain heated at its normal equilibrium temperature and will continue to glow sufficiently for purposes of propellant ignition. The earlier energization of relay 13 and the operation of thermal time switch 12, completed the circuit to energize relay 20 which closed its contacts 60 to complete the circuit and supply electric current to electric igniter propellant valves 14 and 14a, thereby opening them to allow fuel and oxidizer to flow from supply tanks 33 and 34, under pressure from nitrogen gas supplied from tank 28 through conduits 30 and 32 and the connector 31, into the igniter combustion chamber 38 where the fuel is ignited by contact with the heatable element or "hot wire" 19a of the glow plug. Upon the energization of relay 20, its locking contacts 60 closed to continue to supply current to its coil to keep it energized even though relay 13 is later de-energized. Other contacts, 59 and 61, of relay 20 simultaneously opened to break the electrical circuit to the thermal element 12a of thermal time switch 12.

As ignition of the fuel occurs in the igniter combustion chamber 38, a pressure is built up inside that chamber. Connected to the igniter combustion chamber, in communication therewith, is a pressure-operated switch 16 comprising an expansible bellows which carries electrical contacts 65. As the igniter chamber pressure reaches approximately a normal operating value, pressure switch 16 closes its contacts 65 upon extension of its bellows and thus allows current to flow from battery 10 through the coil of relay 18 to energize it. This action causes relay 18 to open its contacts 57 to break the circuit to glow plug 19 and thus shut off the current supply to the glow plug since it is no longer needed. Since relay 13 is in the glow plug circuit, it becomes de-energized and breaks the circuit from contacts 58 of thermal switch 12 to relays 17 and 20. Relays 17 and 20, however, remain locked in an energized position because of the locking contacts 60 of relay 20, which in the energized position of relay 20 allow current to flow to their coils. Electric valves 14 and 14a meanwhile remain energized and open to allow propellants to flow to the igniter to maintain combustion therein.

With the igniter thus in operation, the main propellant valves 25 and 25a can be opened to admit fuel and oxidizer to the combustion chamber of the motor proper. This is done automatically by the operation of pressure switch 16, contacts 65 of which, in addition to furnishing current to relay 18, complete the circuit to supply electric current to the coils of electric solenoid main propellant valves 25 and 25a. These valves then open to admit propellants under pressure from their pressurized supply tanks to the motor's combustion chamber 37 where the fuel is ignited by the flame emanating from the igniter combustion chamber 38 through its outlet 39. Combustion is maintained in the motor combustion chamber by the continuous flow of propellants entering the chamber and ignited by the combustion taking place therein.

Figure 3:
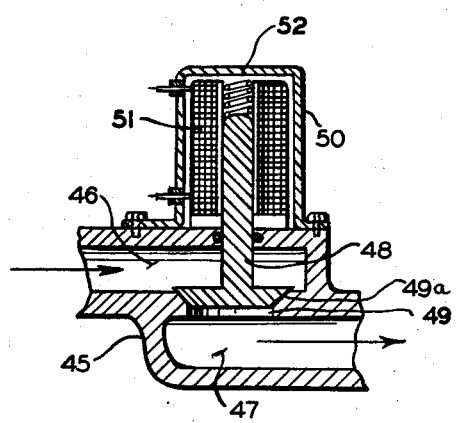
Figure 3 is a cross-sectional view of an electric solenoid valve as utilized in the present invention.

Igniter propellant valves 14 and 14a and main propellant valves 25 and 25a are of the same type except for their size and are shown in cross-section in Figure 3. In that figure, propellant under pressure from its supply tank enters the valve at the left hand side through passage 46 in the direction shown by the arrow. Further passage of propellant is blocked by poppet 48 which closes port 49 by seating on seat 49a in the position shown. The valve is shown in Figure 3 in its de-energized position. Upon energization of coil 51 by the application of suitable electric current thereto, poppet 48 is electromagnetically lifted from seat 49a, thus allowing propellant to flow through port 49 into passage 47 and out of the valve. Upon de-energization of coil 51, poppet 48 is returned to its seat by the force of compression spring 52. Valves of this type are generally known as solenoid or electromagnetic valves.

As combustion takes place in the motor's combustion chamber 37, a second pressure switch 16a, similar to pressure switch 16, is operated by the pressure created in the combustion chamber and transmitted to it through pipe 27. The contacts 56 of switch 16a complete a circuit from the electric power source to the coil of electromagnetic solenoid switch 11 energizing it to move the switch to the Off position. This action breaks the circuit to the entire igniter system and de-energizes the igniter propellant valves 14 and 14a. The circuit to the main propellant valves remains intact, however. Pressure switches 16 and 16a will continue to hold their contacts 56 and 65 closed, despite the fact that the igniter propellant valves are now closed, since the pressure created in the motor combustion chamber will keep the bellows of switch 16 in the distended position as well as distending the bellows of pressure switch 16a, the igniter and motor combustion chamber being connected by opening 39.

From the foregoing, it will be seen that neither the igniter propellant valves, 14 and 14a, nor the main propellant valves, 25 and 25a, will operate unless the electrical circuit to them is first completed through contacts 63 of relay 13. Thus, if the series-connected circuit is not complete through the glow plug element 19a for any reason, the coil of relay 13, which is beyond the glow plug in the circuit, will not become energized and the propellant valves cannot open to allow passage of propellants to the igniter or motor combustion chambers. Time switch 12, however, will operate after the expiration of its usual one-half second time period to supply current through the closed contacts 61 and 62 of relay 20 and relay 13, respectively, to electromagnetic switch 11 to operate it to cut off the current supply from the system. Time switch 21 is unaffected by this action since the current supply to its thermal element 21a is cut off prior to closure of its contacts 55, its time period being longer than that of time switch 12. On the other hand, in the event that the glow plug circuit is continuous and relay 13 is energized but the propellants injected into the igniter combustion chamber 38 fail to ignite for any reason, time switch 21 will operate after a pre-established time interval of more than that of time switch 12, usually of the order of one second. Time switch 21 by closure of its contacts 55 completes an electrical circuit from closed master switch 10a to the coil of the operating solenoid coil of switch 11, thereby opening switch 11 and breaking the electric circuit to igniter propellant valves 14 and 14a, thus causing them to close to stop the flow of propellants. Operation of switch 11 to the Off position also supplies current to the thermal element 22a of time switch 22. After several seconds, contacts 53 of time switch 22 close to complete a circuit through the coil of relay 23 thereby energizing it to cause its contacts 54 to close to complete a circuit to electromagnetic solenoid valve 29. This valve opens and allows nitrogen under pressure from tank 28 to flow through conduit 40 directly into igniter combustion chamber 38 to purge or "blowdown" the chamber to remove the accumulated unburned propellants. This will continue to operate until switch 11 is returned to the On position for a new start, or until master switch 10a is opened to cut off the current supply to the whole system.

Operation of the motor is stopped manually at the will of the operator or automatically upon exhaustion of the propellants. In the first instance, master switch 10a is manually opened to cut off the electric current supply to the entire system, thus causing the main propellant valves 25 and 25a to close to stop the flow of propellants to the motor. In the second instance, upon exhaustion of the propellants, combustion within the motor's combustion chamber will cease and the chamber pressure will decrease. As this occurs, pressure switches 16 and 16a open their respective contacts 65 and 66 as their actuating bellows contract. This action breaks the electrical circuit to main propellant valves 25 and 25a causing them to close. Switch 11 can then be manually operated to supply current to the thermal element 22a of thermal switch 22 which becomes heated and closes its contacts 53 to supply current to relay 23. Operation of relay 23 completes an electrical circuit to electric valve 29 thereby causing it to open and allow nitrogen gas to flow under pressure from gas container 28 through pipe 40 into igniter combustion chamber 38 in order to sweep any accumulated unburned propellants out of the chamber. Upon completion of this purging or "blowdown" action, switch 10a can be closed to stop further purging action and to shut off the electric current supply to the entire system.

While there have been shown and described and pointed out the fundamental novel features of this invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. An igniter control system comprising a glow plug, means for supplying electric current thereto, a current sensing relay coil in direct series connection therewith and between said glow plug and ground in its circuit and energizable only upon a flow of electric current through the said glow plug to the relay coil, a resistor, and switching means operable upon energization of the said current-sensing relay coil and upon the expiration of a pre-established time interval to interpose said resistor in series connection with said relay coil and the ground.

2. The invention set forth in claim 1 with the said switching means comprising a relay having contacts shunting said resistor when said relay is in the de-energized position, and means for energizing said relay upon the expiration of a predetermined time interval to open said contacts.

3. The invention set forth in claim 1 with the said switching means comprising a relay having contacts shunting said resistor when said relay is in the de-energized position, a time switch having contacts in series connection with said relay and with the source of electric current, and electrothermal means for causing closure of said contacts upon the expiration of a pre-established time interval, whereby said relay is energized and the shunt across said resistor is removed.

4. An igniter control system comprising a glow plug, a source of electric current, means for conducting electric current from its source to said glow plug, a current-sensing relay coil in direct series connection with said glow plug and energizable only upon a flow of electric current through the said glow plug to the relay coil, a resistor in series connection therewith and connected to ground, a shunt across said resistor, means for automatically removing said shunt after energization of the current-sensing relay coil and upon the subsequent expiration of a pre-established time interval, an electrothermal time switch operable upon the expiration of a pre-established time interval longer than the aforesaid time interval, means for supplying electric current thereto concurrently with the supply to the said glow plug, and electromagnetic switching means operable upon operation of said electrothermal time switch to interrupt the supply of electric current to the system.

5. The invention set forth in claim 4 with the last-named means comprising an electromagnetic switch having its coil connected to contacts of said electrothermal switch, whereby operation of said electrothermal switch causes said electromagnetic switch to operate to interrupt the supply of electric current to the system.

6. The invention set forth in claim 4 with an electrothermal time switch automatically connected to the source of electric current upon energization of the electromagnetic switching means, contacts of said time switch connected to the coil of a relay, contacts operated by said relay and closed upon energization thereof, means for supplying electric current to the relay contacts, a source of non-combustible gas under pressure, a conduit for carrying said gas to the igniter combustion chamber, and solenoid valve means in said conduit, said valve means blocking flow through the conduit when deenergized and permitting flow therethrough when energized, and said valve means being connected to the contacts of said relay, whereby operation of said relay as a result of operation of said time switch after a pre-established time interval effects completion of an electrical circuit to said solenoid valve means to energize it and thus permit gas to flow through the conduit into said igniter combustion chamber.

7. In an igniter control system, a combustion chamber, an outlet therefor, means for supplying at least one propellant to said combustion chamber, electric valve means for preventing propellant flow to said combustion chamber when in a de-energized condition, a glow plug having a heatable element exposed to the interior of the igniter combustion chamber, an electric current supply source, means for conducting electric current from the supply source to said glow plug, a current-sensing relay coil in series connection with said glow plug and located between it and ground and energizable only upon a flow of electric current through the said glow plug, a resistor in series connection with said relay coil and connected to ground, a shunt for said resistor, an electrothermal time switch operable after energization of the current-sensing relay coil and upon the subsequent expiration of a pre-established time interval, and switch means made effective by operation of said time switch to interrupt said shunt and to supply electric current to energize said electric valve means to permit propellant to flow into the said combustion chamber.

8. In an igniter control system for a reaction motor, an igniter combustion chamber, an outlet therefor, means for supplying at least one propellant to said igniter combustion chamber, electric valve means for blocking propellant flow to said igniter combustion chamber when said electric valve means is in a de-energized condition and permitting flow when in an energized condition, an electric current supply source, means for conducting electric current from the supply source to said glow plug, a current-sensing relay coil in series connection with said glow plug and located in the circuit between said glow plug and ground and energizable only upon a flow of electric current through the said glow plug, a resistor in series connection with said current-sensing relay coil and connected to ground, a shunt for said resistor, an electrothermal time switch operable upon the expiration of a pre-established time interval, contacts operable by energization of said current-sensing relay coil to complete a circuit from the electric current supply source to the time switch, switch means having contacts opened by operation of said time switch to interrupt said shunt and to supply electric current to energize the electric valve means to permit propellant to flow into the combustion chamber, a second relay coil, a pressure switch having contacts which are open when the switch is not under pressure, means connecting said second relay coil to the electric current supply source through the contacts of said pressure switch, means communicably connecting said pressure switch with the interior of said combustion chamber, contacts on said second relay coil arranged to open upon energization thereof, and means for conducting electric current from said supply source through said contacts to said glow plug, whereby combustion in the combustion chamber will operate said pressure switch and said second relay coil will be energized thereby to interrupt the electric current supply to the said glow plug.

9. The invention set forth in claim 8 with a motor combustion chamber in communication with the igniter combustion chamber, means for supplying at least one propellant to said motor combustion chamber, addtional electric valve means for blocking propellant flow to said motor combustion chamber when said additional electric valve means is in a de-energized condition and for permitting flow when in an energized condition, electrical connection between said additional electric valve means and the contacts of said pressure switch, a second pressure switch having contacts which are open when the switch is not under pressure, means communicably connecting said second pressure switch with the interior of said combustion chamber, and means operable upon closure of the contacts of said second pressure switch to interrupt the electric current supply to the first electric valve means, whereby as combustion occurs in the igniter combustion chamber the additional electric valve means will be operated to permit propellants to flow into the motor combustion chamber where ignition occurs due to exposure to the flame emanating from the igniter combustion chamber, and the pressure of the combustion in said motor combustion chamber will operate said second pressure switch to shut off the current supply to the electric valve means associated with the igniter combustion chamber to stop the flow thereto and cause the combustion therein to cease.

References Cited in the file of this patent

UNITED STATES PATENTS

| | | |
|---|---|---|
| 2,596,729 | See | May 13, 1952 |
| 2,606,544 | Church et al. | Aug. 12, 1952 |
| 2,693,849 | Resek et al. | Nov. 9, 1954 |